July 16, 1929. H. P. SAUGMAN 1,720,967
BEVERAGE DISPENSER
Filed Sept. 24, 1926

HARTVIG P. SAUGMAN
INVENTOR

PER Albert J. Fihe
ATTORNEY

Patented July 16, 1929.

1,720,967

UNITED STATES PATENT OFFICE.

HARTVIG P. SAUGMAN, OF GLENDALE, CALIFORNIA.

BEVERAGE DISPENSER.

Application filed September 24, 1926. Serial No. 137,468.

This invention relates to improvements in a beverage dispenser, and has for one of its principal objects, a provision of a new and useful automatically operating mixing and cooling dispensing device, particularly useful with fruit juices and the like.

One of the important objects of this invention is the provision of means whereby a fruit juice, or a syrup, is placed in a container, and additional means whereby water or other liquid to be mixed with the juice is placed in an associated container. The said containers have a system of joint opening ports, so constructed that a correct mixture of the ingredients, whether two or more, can be drawn off at will.

Another and still further important object of this invention is to provide in a dispensing container, means for retaining a quantity of fruit juice, or similar liquid, in condition to be readily dispensed, in a proper mixture with water or other liquids, the same being at the same time surrounded as a whole with a cooling chamber distinct and separate from each of the remaining containers.

Other and further important objects of the invention will be apparent from the disclosures in the accompanying drawings and following specification.

The invention, in a preferred form, is illustrated in the drawings, and hereinafter more fully described.

Figure 1:
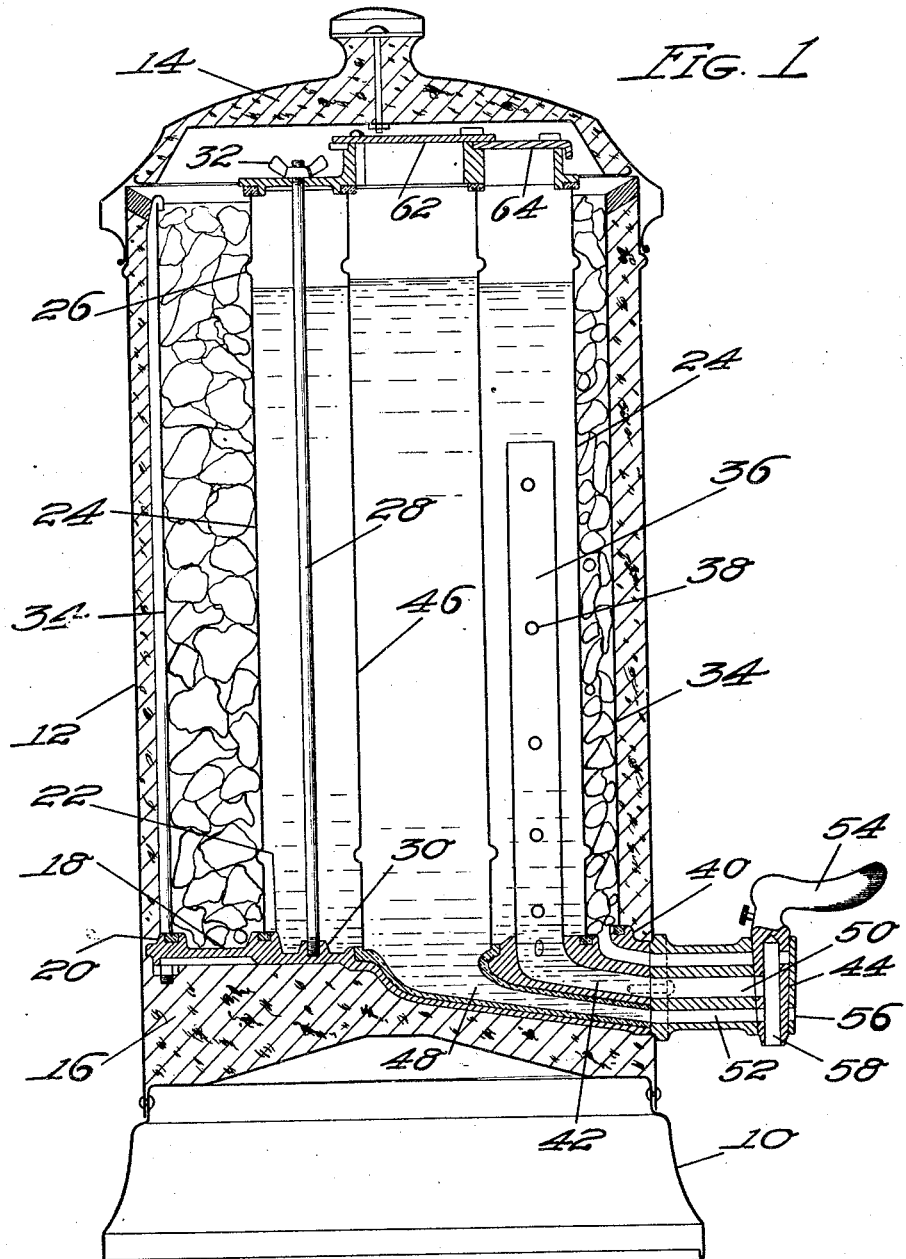
Figure 1 is a vertical sectional elevation of the improved beverage dispenser of this invention.

The reference numeral 10 indicates generally the base of the improved beverage dispenser of this invention, which supports an outer casing 12, preferably cylindrical in cross section and the walls of which are formed of a heat insulating material. A top for the container and removable therefrom is provided as shown at 14.

Mounted upon the base 10 and within the walls of the container 12 is a supporting and heat insulating element 16, preferably composed of cork or other suitable material. Mounted upon this layer of cork is a bottom plate 18, which is in the form shown in Figure 1 and has suitable annular ridges formed integral therewith, as shown at 20 and 22, these being provided for the reception of packing rings, which in turn surround the lower edges of the container elements, preferably cylindrical in form, which separate the ice, water and juice from each other.

As best shown at 24 in Figure 1, a water cylinder is provided having its walls of metal, or the like, and in the walls of this cylinder are formed integral corrugations 26 which allow of a certain elasticity, thereby permitting of a tight joint between the walls of the container and the closure members provided therefor.

A rod 28, preferably of brass or other suitable metal, extends upwardly thru the container 24 and has its lower end screw-threaded in a suitable socket 30, formed in the base 18. Adapted to co-operate with the upper end of the rod 28, which extends beyond the upper edge of the cylinder 24, is a winged nut 32, and a plurality of these rods may be provided if desired.

Also mounted in the base 18 and surrounding the cylinder 24, is a container 34, in which ice is placed, and the walls of this container are slightly spaced from the inner face of the walls of the container 12, so as to provide a dead air space for additional heat insulation.

Positioned within the cylinder 24 is an upwardly extending water tube, as shown at 36, which has a series of openings 38 along its height, allowing water to pass to the interior thereof. This water tube is mounted in a suitable support 40, which in turn is attached to the casing 12, at the lower portion thereof, and in a recess or depression formed in the insulating base 16. This support 40 is provided with a passage 42 therein, which allows of the delivery of water to the faucet or mixing valve 44.

Positioned inside the water cylinder 24, is a fruit juice container 46, which is also mounted in a leakproof manner with respect to the base plate 18 and a corresponding extension of the member 40. From this fruit juice container, which is similar in construction to the cylinders 26 and 34, leads a delivery passage 48, which also empties into the mixing valve or faucet 44.

The faucet 44 is provided with a water outlet 50 which forms an extension of the delivery tube 42, and is provided with a juice outlet 52, which forms an extension of the delivery tube 48, and these outlets are of such proportionate dimensions that any desired mixture of the juice and water can be had, depending on the size of the outlets.

The valve or faucet 44 is provided with a handle 54, which forms an integral portion of a valve plug 56, which is hollowed out, as shown, to form a mixing chamber 58, which is also the delivery outlet.

Figure 2:
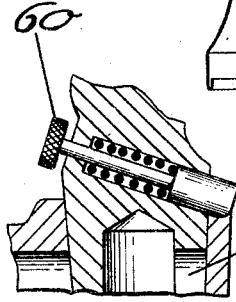
Figure 2 is a detail view, illustrating a portion of the mixing valve construction.

As shown in Figure 2, a spring controlled release means 60, is provided for the handle 54 and the plug 56, whereby the same can be turned into a position to allow water to drain off from the ice chamber 34.

At the top of the container is provided a number of separate covers for the juice and water containing cylinders, as shown at 62 and 64, respectively. These covers are preferably made slidable for easy operation, and cracked ice may be placed in the chamber 34, by simply removing the top 14. This of course is done when the openings 62 and 64 are closed. The control of the waterflow is regulated by the size of the openings 38 in the tube 36, these holes being made of any predetermined size, so as to produce any desired mixture. The control of the flow of juice is had by varying the size of the opening in the valve plug. The juice and water cylinders can be readily removed for cleaning by taking off the winged nuts 32 from the rods 28.

It will be noted that the cylinders or containers for the syrups, fruit juices and the water, together with the containers for the ice, are spaced eccentrically with relation to each other and to the dispenser casing, thereby conserving space and allowing of a more efficient distribution of the cooling effects of the cracked ice.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. In combination, a cooling and proportionate mixing dispenser for liquid syrups, juices and water, said dispenser including a plurality of removable containers for various liquids, a top for the dispenser, and additional individual covers for the containers separated by an air space from the top, said individual covers overlapping each other at certain portions of their peripheries.

2. A tank having a bottom with three outlet ports integrally associated therewith; vertical walls within the tank to separate the ports from each other whereby to produce concentric fluid containers and a surrounding ice container and a valve to mix the fluids as dispensed, said valve having an additional port to drain the ice container.

In testimony whereof I affix my signature.

HARTVIG P. SAUGMAN.